United States Patent
Stewart

(10) Patent No.: US 8,011,246 B2
(45) Date of Patent: Sep. 6, 2011

(54) APPARATUS AND METHOD FOR SELF-CALIBRATION OF CORIOLIS VIBRATORY GYROSCOPE

(75) Inventor: Robert E. Stewart, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 463 days.

(21) Appl. No.: 12/284,421

(22) Filed: Sep. 22, 2008

(65) Prior Publication Data

US 2010/0071465 A1 Mar. 25, 2010

(51) Int. Cl.
*G01P 9/00* (2006.01)
*G01P 21/00* (2006.01)

(52) U.S. Cl. ............... 73/504.13; 73/504.12; 73/1.37

(58) Field of Classification Search ........... 73/504.04, 73/504.02, 504.12, 504.13, 504.14
See application file for complete search history.

(56) References Cited

U.S. PATENT DOCUMENTS

| | | | | |
|---|---|---|---|---|
| 5,471,875 | A * | 12/1995 | Sato et al. | 73/504.13 |
| 7,040,163 | B2 | 5/2006 | Shcheglov et al. | |
| 7,103,477 | B1 | 9/2006 | Lee | |
| 7,392,702 | B2 | 7/2008 | Stewart et al. | |
| 7,565,839 | B2 * | 7/2009 | Stewart et al. | 73/504.12 |
| 7,739,896 | B2 * | 6/2010 | Stewart | 73/1.37 |
| 7,874,209 | B2 * | 1/2011 | Stewart | 73/504.01 |
| 2007/0034006 | A1 | 2/2007 | Stewart | |
| 2007/0039386 | A1 | 2/2007 | Stewart | |
| 2007/0089510 | A1 * | 4/2007 | Wyse et al. | 73/504.12 |
| 2007/0119258 | A1 * | 5/2007 | Yee | 73/649 |

OTHER PUBLICATIONS

U.S. Appl. No. 11/500,044, filed Aug. 7, 2006, Stewart, Robert E.
U.S. Appl. No. 11/724,378, filed Mar. 15, 2007, Stewart, Robert E.
U.S. Appl. No. 11/729,007, filed Mar. 28, 2007, Stewart, Robert E.
E.J. Loper and D.D. Lynch; Hemispherical Resonator Gyro: Status Report and Test Results; Delco Systems Operations; Jan. 1984; pp. 1-3, S84; General Motors Corporation; Goleta, CA 93117; USA.
Hayworth, Ken J.; Switched Drive-Angle Continuously Auto-Tuning Zro-Calibrating; National Aeronautics and Space Administration Contract No. NAS-7-918 Technical Support Package.
Oct. 2003; NASA Tech Brief vol. 27, No. 10 from JPL New Technology Report NPO-30449; Jet Propulsion Laboratory California Institute of Technology Pasadena, CA; USA.

* cited by examiner

*Primary Examiner* — Helen C. Kwok

(74) *Attorney, Agent, or Firm* — Carmen Patti Law Group, LLC

(57) ABSTRACT

A control component of an apparatus in one example is configured to signal a plurality of electrodes arranged in at least first, second, third, and fourth radial electrode groups along first, second, third, and fourth axes at approximately 0, 45, 90, and 135 degrees, respectively, around the planar resonator. During a first time period, the control component is configured to signal: the first radial electrode group to induce a drive oscillation in the planar resonator, the third radial electrode group to sense the drive oscillation, the second radial electrode group to sense a Coriolis force induced oscillation, and the fourth radial electrode group to null the Coriolis force induced oscillation. During a second time period after the first time period, the control component is configured to signal: the second radial electrode group to induce the drive oscillation in the planar resonator, the fourth radial electrode group to sense the drive oscillation, the first radial electrode group to sense the Coriolis force induced oscillation, and the third radial electrode group to null the Coriolis force induced oscillation.

20 Claims, 2 Drawing Sheets

APPARATUS AND METHOD FOR SELF-CALIBRATION OF CORIOLIS VIBRATORY GYROSCOPE

TECHNICAL FIELD

The invention relates generally to gyroscopes and more particularly to self-calibration of gyroscopes.

BACKGROUND

In the current state of the art, the bias, scale factor and alignment of gyros and accelerometers are calibrated over temperature at the system level during a final acceptance test. A thermal model is generated and stored in the system's processor. The thermal model is used to correct the gyro output signal over temperature fluctuations. The residual error to the thermal model and instabilities over time determines the ultimate performance limits of the inertial system.

E. J. Loper and D. D. Lynch ("Hemispherical Resonator Gyro: Status Report and Test Results", National Technical Meeting of the Institute of Navigation, 17-19 Jan., 1984 at San Diego, Calif.) disclose a method of resetting a resonator pattern angle to average out the bias drift. Hayworth (NASA TECH BRIEF Vol. 27, No. 10 for October 2003—JPL NEW TECHNOLOGY REPORT NPO-30449) discloses interchanging drive and sense pickoff electrodes with drive and sense forcer electrodes. However, this approach is subject to errors associated with misalignment of the forcer and pickoff electrodes.

SUMMARY

The invention in one implementation encompasses an apparatus. The apparatus comprises a control component configured to signal a plurality of electrodes arranged in at least first, second, third, and fourth radial electrode groups along first, second, third, and fourth axes at approximately 0, 45, 90, and 135 degrees, respectively, around the planar resonator. During a first time period, the control component is configured to signal: the first radial electrode group to induce a drive oscillation in the planar resonator, the third radial electrode group to sense the drive oscillation, the second radial electrode group to sense a Coriolis force induced oscillation, and the fourth radial electrode group to null the Coriolis force induced oscillation. During a second time period after the first time period, the control component is configured to signal: the second radial electrode group to induce the drive oscillation in the planar resonator, the fourth radial electrode group to sense the drive oscillation, the first radial electrode group to sense the Coriolis force induced oscillation, and the third radial electrode group to null the Coriolis force induced oscillation.

Another implementation of the invention encompasses a method. During a first time period: a first radial electrode group is signaled to induce a drive oscillation in a planar resonator; a third radial electrode group is signaled to sense the drive oscillation; a second radial electrode group is signaled to sense a Coriolis force induced oscillation; and a fourth radial electrode group is signaled to null the Coriolis force induced oscillation. During a second time period after the first time period: the second radial electrode group is signaled to induce the drive oscillation in the planar resonator; the fourth radial electrode group is signaled to sense the drive oscillation; the first radial electrode group is signaled to sense the Coriolis force induced oscillation; and the third radial electrode group is signaled to null the Coriolis force induced oscillation. The first, second, third, and fourth radial electrode groups are arranged along first, second, third, and fourth axes at approximately 0, 45, 90, and 135 degrees, respectively, around the planar resonator.

A further implementation of the invention encompasses a method. A plurality of electrodes of a gyroscope are signaled during a first time period to: induce and sense drive oscillations along a first set of orthogonal axes of a planar resonator of the gyroscope, and to sense and null a Coriolis force induced oscillation along a second set of orthogonal axes of the planar resonator. The first set of orthogonal axes are offset 45 degrees from the second set of orthogonal axes. The plurality of electrodes of the gyroscope are signaled during a second time period to: induce and sense drive oscillations along the second set of orthogonal axes, and to sense and null the Coriolis force induced oscillation along the second set of orthogonal axes.

DESCRIPTION OF THE DRAWINGS

Features of example implementations of the invention will become apparent from the description, the claims, and the accompanying drawings in which:

DETAILED DESCRIPTION

Figure 1:
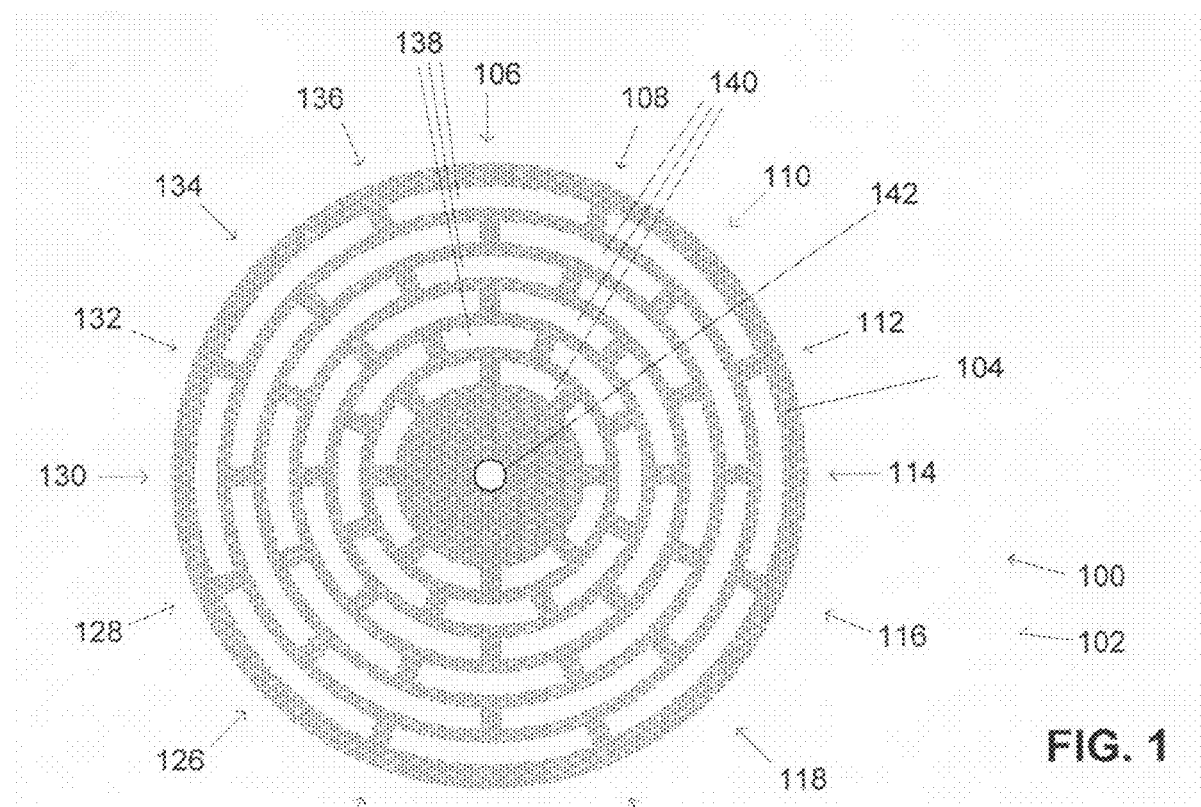
FIG. 1 is a top view of one implementation of an apparatus that comprises a Coriolis Vibratory Gyro (CVG) and illustrates a resonator of the CVG.

Turning to FIG. 1, an apparatus 100 in one example comprises a Coriolis Vibratory Gyroscope 102 (CVG), for example, a Class II CVG, disk resonator gyro (DRG), microelectromechanical system (MEMS) gyro, hemispherical resonator gyro (HRG), or ring resonator gyro. One example of a disk resonator gyro is disclosed by Shcheglov et al. in U.S. Pat. No. 7,040,163, the disclosure of which is hereby incorporated by reference. The CVG 102 comprises a resonator 104 which is configured for in-plane oscillation, for example, a disk, short cylinder, or alternative planar geometry. The resonator 104 in one example comprises a plurality of slots. The slots in one example are formed from concentric circumferential segments. In the implementation shown in FIG. 1, the slots are arranged such that adjacent slots within a "ring" are approximately 45 degrees apart. In this implementation, the slots are arranged in radial groups 106, 108, 110, 112, 114, 116, 118, 120, 122, 124, 126, 128, 130, 132, 134, and 136. For example, radial group 106 comprises three slots 138 and radial group 108 comprises three slots 140. In the implementation of FIG. 1, the slots within a radial group are arranged in alternating concentric rings. The resonator 104 in one example is coupled to a base 304 (FIG. 3) by a center support 142. The resonator 104 may be fabricated in various materials such as single crystal silicon (111 crystal orientation) and fused silica (quartz). Alternate materials will be apparent to those skilled in the art.

Figure 2:
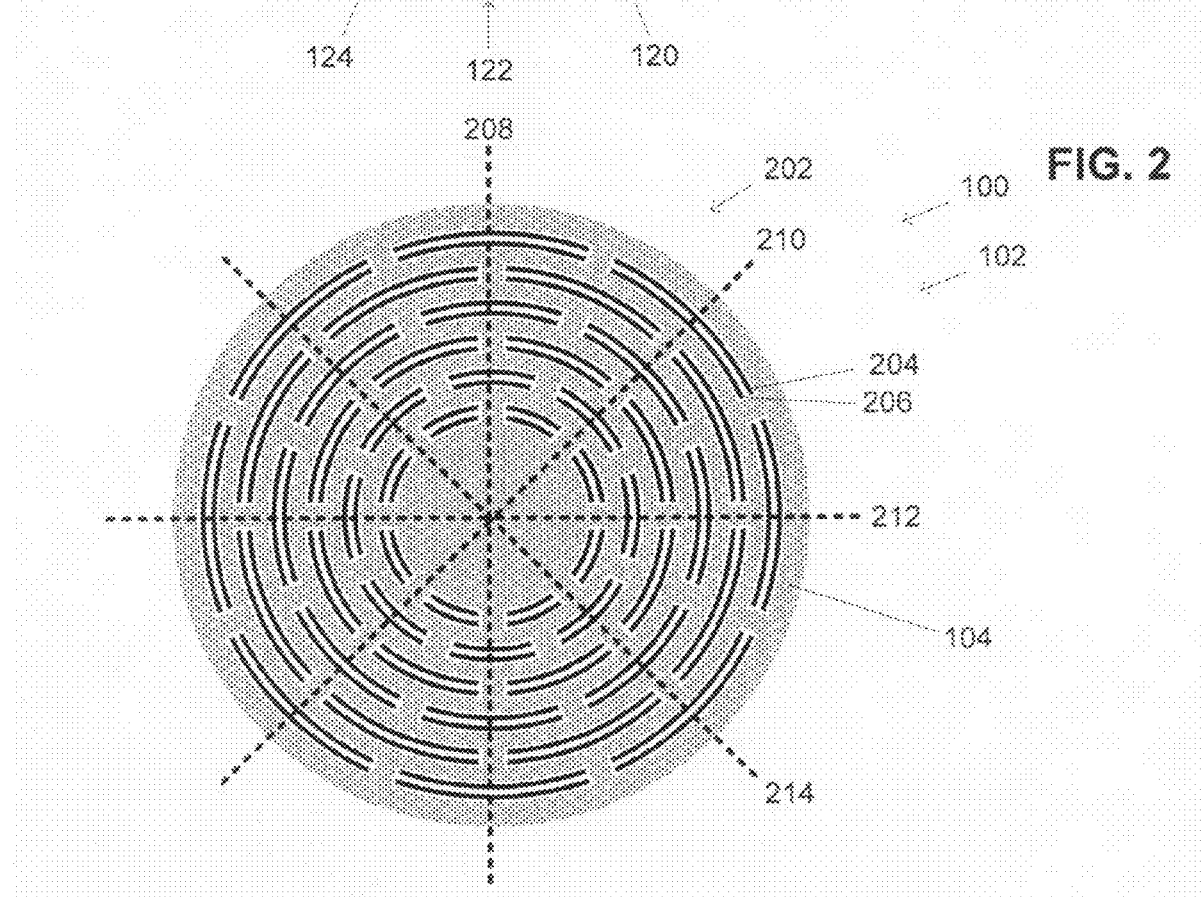
FIG. 2 is a top view of the apparatus of FIG. 1 and further illustrates electrodes of the CVG with the resonator.

Turning to FIG. 2, the plurality of slots in the resonator 104 are formed along resonant axes within the resonator 104. Resonant axes 208, 210, 212, and 214 of the resonator 104 are shown in FIG. 2. The CVG 102 in one example comprises a plurality of electrodes 202. The plurality of electrodes 202 in one example are positioned within the slots of the resonator 104. In a further example, the electrodes 202 are coupled to the base 304 by pillars but do not physically contact the resonator 104, as will be appreciated by those skilled in the art. In the implementation of FIG. 2, each slot comprises two electrodes. An outermost slot of radial group 110 for example comprises an outer electrode 204 and an inner electrode 206. In alternative implementations, individual slots may comprise different configurations of no electrodes, a single electrode, a plurality of electrodes, and single- or multi-element electrodes. The plurality of electrodes 202 in one example are configured for one or more of (1) inducing a drive oscillation in the resonator 104, (2) sensing the drive oscillation of the resonator 104, (3) sensing a Coriolis induced oscillation, and/or (4) nulling the Coriolis induced oscillation.

Figure 3:
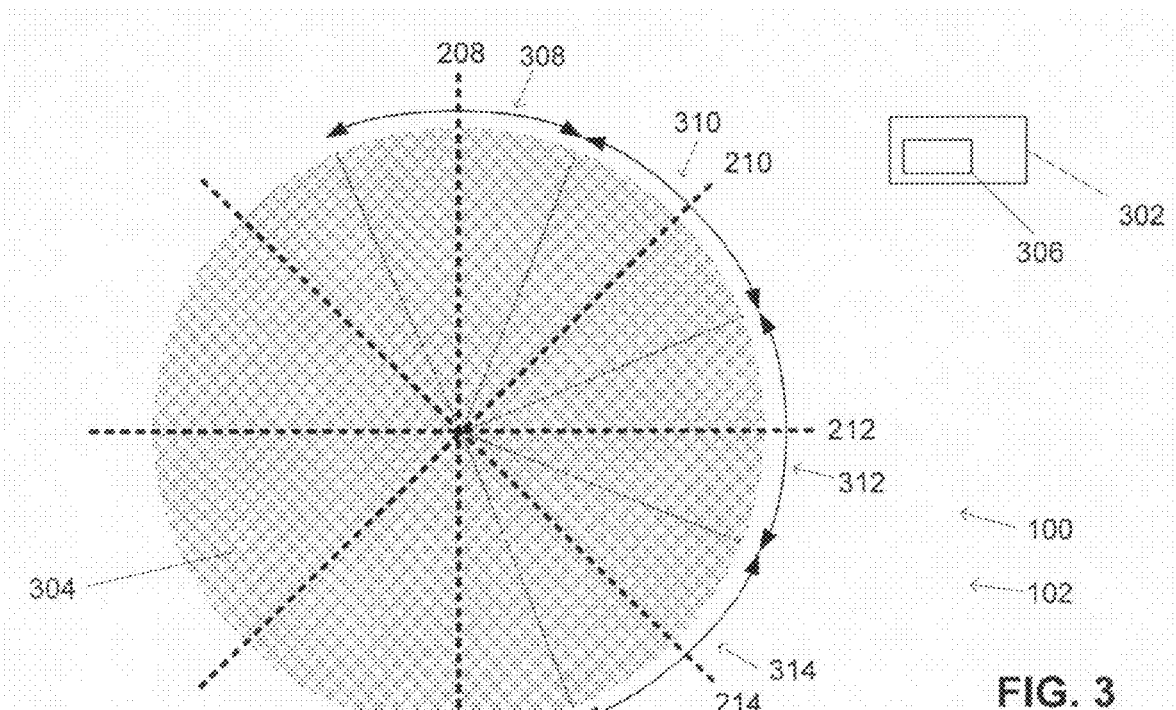
FIG. 3 is a top view of the apparatus of FIG. 1 and further illustrates a base for the CVG and a control component.

Turning to FIG. 3, the plurality of electrodes 202 in one example are arranged in a plurality of radial regions 308, 310, 312, and 314 where adjacent regions are approximately 45 degrees apart and centered on axes 208, 210, 212, and 214, respectively. For example, radial region 308 comprises the electrodes in slots 138. In a further example, the radial region 308 comprises a portion of the electrodes in adjacent slots, for example, electrodes or portions of electrodes on a left side of slots 140 where the electrodes are subdivided or multi-element electrodes. A control component 302 in one example is communicatively coupled with the electrodes 202. The control component 302 in one example is configured to send signals to and/or receive signals from the electrodes 202 for driving and sensing the drive oscillations and/or nulling and sensing the Coriolis induced oscillation. The control component 302 in one example comprises an instance of a recordable data storage medium 306, as described herein.

The control component 302 in one example is configured to allow self-calibration of a gyro bias for the CVG 102 by reversing drive and sense modes of the gyro, as described herein. In this implementation with self-calibration, the gyro bias is continuously measured and removed, for example, through employment of a Kalman filter (not shown). In further implementations that utilize two or more gyro sensing elements, self-calibration of the gyro bias can be performed under dynamic operating conditions. This allows previously uncompensated errors due to hysteresis and instabilities of the thermal model over time to be reduced or eliminated.

Class II CVGs are unique in the ability to easily interchange the drive and sense axes. When the drive and sense axes are reversed the gyro scale factor polarity is reversed while the polarity of the gyro bias remains unchanged. This allows the observation of the gyro bias in much the same way as during conventional calibration when the polarity of the input rate is reversed. Processing gyro outputs of normal and reverse polarity modes can be used to cancel the input rate and double the bias signal, as described in U.S. Pat. No. 7,103,477.

An illustrative description of operation of the apparatus 100 is presented, for explanatory purposes. The CVG 102 in one example is operated in a "closed-loop" mode. During a first time period, the control component 302 signals the radial region 308 (e.g., signals the electrodes 202 therein) to induce a drive oscillation in the planar resonator 104, for example, along the axis 208. In a further example, the control component 302 also signals the radial region opposite the radial region 308 and along the axis 208 to induce the drive oscillation (e.g., the electrodes 202 within radial group 122 and portions of radial groups 120 and 124). The control component 302 signals the radial region 312 to sense the drive oscillation in the planar resonator 104. For example, the control component 302 employs feedback from the electrodes 202 along the axis 212 to regulate a frequency, amplitude, phase, or other characteristics of the drive oscillation.

The drive oscillation in combination with an angular rate of the CVG 102 causes a Coriolis force induced oscillation in the planar resonator 104, for example, along the axis 210. The control component 302 in one example signals the radial region 310 (e.g., signals the electrodes 202 therein) to sense the Coriolis force induced oscillation. In a further example, the control component also signals the radial region opposite the radial region 310 and along the axis 210 to sense the Coriolis force induced oscillation. The control component 302 in one example employs feedback from the electrodes 202 in the radial region 310 to determine the angular rate of the CVG 102, as described herein. The control component 302 in another example signals the radial group 314 (e.g., along the axis 214) to null the Coriolis force induced oscillation, for example, in a force-to-rebalance mode, as will be appreciated by those skilled in the art.

The control component 302 in one example is configured to determine a change-over time for the CVG 102. In another example, the change-over time is a predetermined value or duration, for example, 5 seconds, one minute, five minutes, or other suitable durations. When the duration of the first time period has reached the change-over time, the control component 302 performs a change-over of the CVG 102. During the first time period, the axis 208 comprises an anti-nodal drive axis, the axis 210 comprises a nodal pickoff axis, the axis 212 comprises an anti-nodal pickoff axis, and the axis 214 comprises a nodal drive axis. As shown in FIGS. 2-3, the anti-nodal axes 208 and 212 (e.g., drive axes) are orthogonal, the nodal axes 210 and 214 (sense axes) are orthogonal, and the drive and sense axes are offset by 45 degrees.

Upon the change-over, the control component 302 interchanges the anti-nodal and nodal axes of the CVG 102 and begins a second time period with the interchanged axes, as will be appreciated by those skilled in the art. During the second time period, the control component 302 signals the radial region 310 (e.g., signals the electrodes 202 therein) to induce the drive oscillation in the planar resonator 104, for example, along the axis 210. In a further example, the control component 302 also signals the radial region opposite the radial region 310 and along the axis 210 to induce the drive oscillation (e.g., the electrodes 202 within radial group 126 and portions of radial groups 124 and 128). The control component 302 signals the radial region 314 to sense the drive oscillation in the planar resonator 104. For example, the control component 302 employs feedback from the electrodes 202 along the axis 214 to regulate a frequency, amplitude, phase, or other characteristics of the drive oscillation.

With the interchanged axis, the drive oscillation in combination with the angular rate of the CVG 102 causes the Coriolis force induced oscillation in the planar resonator 104 along the axis 208. The control component 302 in one example signals the radial region 308 (e.g., signals the electrodes 202 therein) to sense the Coriolis force induced oscillation. In a further example, the control component also signals the radial region opposite the radial region 308 and along the axis 208 to sense the Coriolis force induced oscillation. The control component 302 in one example employs feedback from the electrodes 202 in the radial region 308 to determine the angular rate of the CVG 102, as described herein. The control component 302 in another example signals the radial group 312 (e.g., along the axis 212) to null the Coriolis force induced oscillation, for example, in the force-to-rebalance mode, as will be appreciated by those skilled in the art.

The control component 302 in one example performs the change-over to reverse a polarity of the scale factor for the CVG 102, however, the bias of the CVG 102 remains unchanged. This allows the bias of the CVG 102 to be observed. By processing an output of a normal polarity mode (e.g., a CVG during the first time period) with an output of a reverse polarity mode (e.g., a CVG during the second time period), the angular rate is canceled and the bias is doubled. In one example, the control component 302 takes simultaneous measurements from a first CVG with normal polarity and from a second CVG with reverse polarity. The control component 302 avoids errors due to misalignment of the electrodes 202 by interchanging the anti-nodal drive electrodes (axis 208) with the nodal pickoff electrodes (axis 210) and interchanging the anti-nodal pickoff electrodes (axis 212) with the nodal drive electrodes (axis 214).

Figure 4:
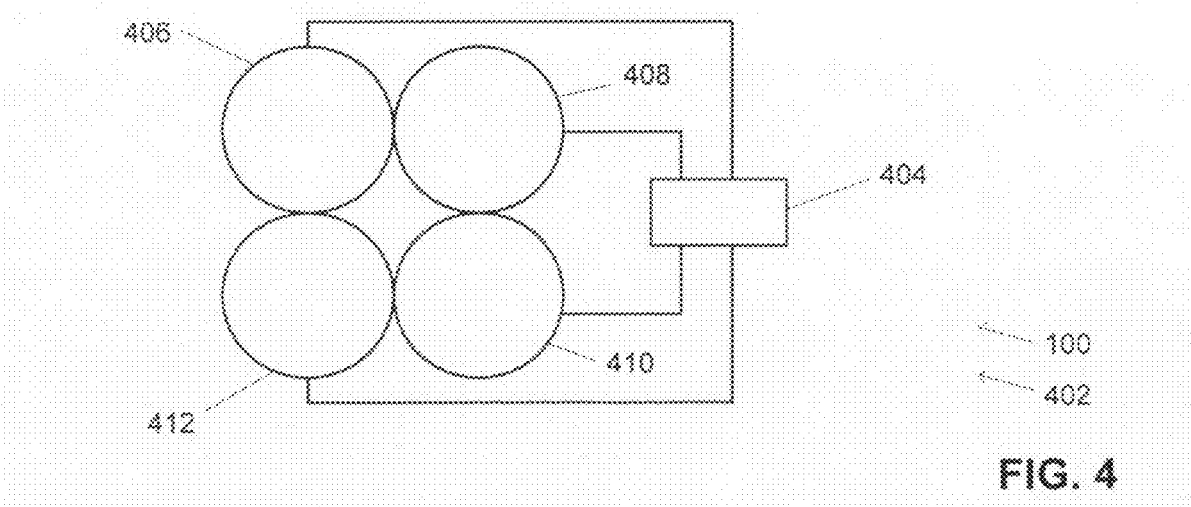
FIG. 4 is a representation of one implementation of an apparatus that comprises an inertial navigation unit with at least two CVGs of the apparatus of FIG. 1.

Turning to FIG. 4, an inertial navigation system 402 in one example comprises a control component 404 and at least two gyroscopes, for example, CVGs 406, 408, 410, and 412. The CVGs 406, 408, 410, and 412 are analogous to the CVG 102. In a further example, the at least two gyroscopes comprise four gyroscopes in a tetra-hedral configuration. The control component 404 is analogous to the control component 302 and communicatively coupled with the plurality of CVGs 406, 408, 410, and 412. The control component 404 in one example comprises a Kalman filter (not shown) for processing outputs from the at least two gyroscopes. Examples of processing the outputs is described in U.S. Pat. No. 7,103,477, the disclosure of which is hereby incorporated by reference. Bias error signals from the CVGs have two states, normal and reversed, which correspond to a sign relationship between the sensed input value of the CVG and the bias error signal. For example, a "+" relationship represents that the bias signal is added to the sensed input signal and a "−" relationship represents that the bias signal is subtracted from the sensed input signal. The "normal" relationship can be either in a "+" or "−" relationship depending upon the type of error correction to be implemented. The "reversed" relationship represents the opposite sign from the normal relationship. In this example, normal and reversed correspond to a "+" and "−" relationship, respectively.

The at least two gyroscopes in one example are configured with a same sensitive axis (e.g., with respective center supports 142 that are parallel). The control component 404 in one example signals the electrodes of the at least two gyroscopes such that the gyroscopes comprise alternating bias polarities. Accordingly, the control component 404 may process outputs of a first gyroscope in a normal polarity mode (e.g., during the first time period) with an output of a second gyroscope in a reverse polarity mode (e.g., during the second time period). Since the first and second gyroscopes comprise the same sensitive axis, the angular rate is canceled and the bias is doubled. The control component 404 in one example performs self-calibration of the inertial navigation system 402 by measuring and removing the bias of the gyroscopes. In an alternate implementation, a single gyroscope with at least two resonators is used instead of two separate gyroscopes, where the at least two resonators have alternating polarities, as will be appreciated by those skilled in the art. In yet another implementation, a single gyroscope with a single resonator is used, for example, in a gyrocompassing implementation.

In one example, the control component 404 obtains measurements of outputs from the at least two gyroscopes during at least two time periods. In a further example, the control component 404 obtains measurements of the outputs during four time periods. For each time period, one of the bias signals is sequenced between a normal and reversed state. In one example, the bias signals are sequenced between the four unique combinations for a first and second CVG: normal polarity for both the first and second CVGs, reverse polarity for the first CVG and normal polarity for the second CVG, reverse polarity for both the first and second CVGs, and normal polarity for the first CVG and reverse polarity for the second CVG.

The control component 404 in one example takes the measurements after a pre-determined setup time to allow stabilization of the CVGs after a change-over. Information obtained during two time periods is utilized as part of a self-calibration process and hence the rate of sequencing will define the maximum rate at which new calibration information can be calculated. Although it may be desirable to sequence through all four combinations of states as shown in FIG. 1 with corresponding calculations for bias error, two time intervals with a change of sign of one of the two bias signals will yield sufficient information to make a bias error calculation, as will be appreciated by those skilled in the art.

The control component 404 in one example determines change-over times for the at least two gyroscopes. In one example, the control component 404 selects change-over times that are separated by predetermined time period, for example, a native integration time of the gyroscopes. The control component 404 in one example performs the change-overs of the at least two gyroscopes with a round-robin technique. For example, the control component 404 performs change-overs of the gyroscopes in a sequence of CVG 406, CVG 408, CVG 410, CVG 412, CVG 406, CVG 408, and so on.

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 306 of the control component 302. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a control component configured to signal a plurality of electrodes arranged in at least first, second, third, and fourth radial electrode groups along first, second, third, and fourth axes at approximately 0, 45, 90, and 135 degrees, respectively, around the planar resonator;

wherein, during a first time period, the control component is configured to signal:

the first radial electrode group to induce a drive oscillation in a planar resonator, the third radial electrode group to sense the drive oscillation, the second radial electrode group to sense a Coriolis force induced oscillation, and the fourth radial electrode group to null the Coriolis force induced oscillation;

wherein, during a second time period after the first time period, the control component is configured to signal:

the second radial electrode group to induce the drive oscillation in the planar resonator, the fourth radial electrode group to sense the drive oscillation, the first radial electrode group to sense the Coriolis force induced oscillation, and the third radial electrode group to null the Coriolis force induced oscillation.

2. The apparatus of claim 1, wherein the plurality of electrodes within the first, second, third, and fourth radial electrode groups are arranged in alternating concentric rings about a center support of the planar resonator;

wherein the first, second, third, and fourth axes extend across a diameter of the planar resonator and approximately through the center support of the planar resonator.

3. The apparatus of claim 2, wherein the first, second, third, and fourth radial electrode groups comprise electrodes on opposite sides of the center support of the planar resonator along the first, second, third, and fourth axes, respectively.

4. The apparatus of claim 1, wherein, during a third time period after the second time period, the control component is configured to signal:

the first radial electrode group to induce the drive oscillation in the planar resonator, the third radial electrode group to sense the drive oscillation, the second radial electrode group to sense the Coriolis force induced oscillation, and the fourth radial electrode group to null the Coriolis force induced oscillation.

5. The apparatus of claim 1, wherein the control component determines an angular rate of the planar resonator based on the Coriolis force induced oscillation.

6. The apparatus of claim 5, wherein the plurality of electrodes and the planar resonator comprise a portion of a first gyroscope;

wherein the first time period corresponds to a normal polarity of the first gyroscope and the second time period corresponds to a reverse polarity of the first gyroscope;

wherein the control component is configured to signal a plurality of electrodes of a second gyroscope, wherein the first and second gyroscopes comprise a same sensitive axis;

wherein the control component is configured to perform a plurality of change-overs to transition the first gyroscope and the second gyroscope between the normal and reverse polarities.

7. The apparatus of claim 6, wherein the angular rate comprises an angular rate of the first gyroscope and the second gyroscope;

wherein the control component is configured to determine the angular rate through employment of a Kalman filter that receives outputs from the first and second gyroscopes.

8. The apparatus of claim 7, wherein the control component is configured to perform the plurality of change-overs such that the respective polarities of the first and second gyroscopes are:

normal and normal during the first period, reverse and normal during the second period, reverse and reverse during a third period, and normal and reverse during a fourth period;

wherein the control component is configured to employ measurements of the outputs from the first and second gyroscopes taken from the first, second, third, and fourth periods to determine the angular rate of the planar resonator.

9. The apparatus of claim 8, wherein the control component is configured to measure the outputs from the first and second gyroscopes during the first, second, third, and fourth periods after a pre-determined setup time.

10. The apparatus of claim 9, wherein a duration of the first, second, third, and fourth periods is based on a native integration time of the first and second gyroscopes.

11. The apparatus of claim 10, wherein the control component is communicatively coupled with a plurality of gyroscopes, wherein the plurality of gyroscopes comprise the first and second gyroscopes, wherein the plurality of gyroscopes comprise a same sensitive axis;

wherein the control component is configured to perform a plurality of change-overs of the plurality of gyroscopes with a round-robin procedure.

12. A method, comprising the steps of:

signaling, during a first time period, a first radial electrode group to induce a drive oscillation in a planar resonator;

signaling, during the first time period, a third radial electrode group to sense the drive oscillation;

signaling, during the first time period, a second radial electrode group to sense a Coriolis force induced oscillation;

signaling, during the first time period, a fourth radial electrode group to null the Coriolis force induced oscillation;

signaling, during a second time period after the first time period, the second radial electrode group to induce the drive oscillation in the planar resonator;

signaling, during the second time period, the fourth radial electrode group to sense the drive oscillation;

signaling, during the second time period, the first radial electrode group to sense the Coriolis force induced oscillation; and signaling, during the second time period, the third radial electrode group to null the Coriolis force induced oscillation;

wherein the first, second, third, and fourth radial electrode groups are arranged along first, second, third, and fourth axes at approximately 0, 45, 90, and 135 degrees, respectively, around the planar resonator.

13. The method of claim 12, further comprising the steps of:

signaling, during a third time period after the second time period, the first radial electrode group to induce the drive oscillation in the planar resonator;

signaling, during the third time period, the third radial electrode group to sense the drive oscillation;

signaling, during the third time period, the second radial electrode group to sense the Coriolis force induced oscillation;

signaling, during the third time period, the fourth radial electrode group to null the Coriolis force induced oscillation.

14. The method of claim 12, further comprising the step of:
determining an angular rate of the planar resonator based on the Coriolis force induced oscillation.

15. The method of claim 12, wherein a first gyroscope comprises the planar resonator, the method further comprising the steps of:
performing a first change-over to transition the first gyroscope from the first time period to the second time period; and
processing measurements from the first gyroscope and a second gyroscope during the first time period and measurements from the first gyroscope and the second gyroscope during the second time period to perform self-calibration of the first and second gyroscopes.

16. The method of claim 15, wherein the method further comprises the step of:
performing a second change-over to transition the second gyroscope from the second time period to a third time period after the second time period, the second change-over occurring after a pre-determined time period from the first change-over.

17. The method of claim 16, further comprising the step of:
performing a plurality of change-overs to transition a plurality of gyroscopes with a round-robin procedure, wherein the plurality of gyroscopes comprises the first and second gyroscopes, wherein the plurality of change-overs are separated by the predetermined time period.

18. A method, comprising the steps of:
signaling a plurality of electrodes of a gyroscope during a first time period to:
induce and sense drive oscillations along a first set of orthogonal axes of a planar resonator of the gyroscope, and to
sense and null a Coriolis force induced oscillation along a second set of orthogonal axes of the planar resonator,
wherein the first set of orthogonal axes are offset 45 degrees from the second set of orthogonal axes;
signaling the plurality of electrodes of the gyroscope during a second time period to:
induce and sense drive oscillations along the second set of orthogonal axes, and to sense and null the Coriolis force induced oscillation along the second set of orthogonal axes.

19. The method of claim 18, wherein a first gyroscope comprises the planar resonator, the method further comprising the steps of:
performing a first change-over to transition the first gyroscope from the first time period to the second time period;
processing measurements from the first gyroscope and a second gyroscope during the first time period and measurements from the first gyroscope and the second gyroscope during the second time period to perform self-calibration of the first and second gyroscopes.

20. The method of claim 19, further comprising the step of:
performing a plurality of change-overs to transition a plurality of gyroscopes with a round-robin procedure, wherein the plurality of gyroscopes comprises the first and second gyroscopes, wherein the plurality of change-overs are separated by a predetermined time period.

* * * * *